(12) United States Patent
Kwon et al.

(10) Patent No.: US 9,839,900 B2
(45) Date of Patent: Dec. 12, 2017

(54) CARBON DIOXIDE ADSORBENTS, PRODUCTION METHODS THEROF, AND METHODS FOR SEPARATING CARBONDIOXIDE USING THE SAME

(71) Applicant: Samsung Electronics Co., Ltd., Suwon-Si, Gyeonggi-Do (KR)

(72) Inventors: Soon Chul Kwon, Hwaseong-si (KR); Hyuk Jae Kwon, Suwon-si (KR); Hyun Chul Lee, Hwaseong-si (KR); Jun Ho Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 30 days.

(21) Appl. No.: 14/563,212

(22) Filed: Dec. 8, 2014

(65) Prior Publication Data

US 2015/0182944 A1     Jul. 2, 2015

(30) Foreign Application Priority Data

Dec. 31, 2013   (KR) .................. 10-2013-0169373

(51) Int. Cl.
   *B01D 53/02*   (2006.01)
   *B01J 20/28*   (2006.01)
   (Continued)

(52) U.S. Cl.
   CPC ........ *B01J 20/28083* (2013.01); *B01D 53/02* (2013.01); *B01D 53/62* (2013.01);
   (Continued)

(58) Field of Classification Search
   CPC ...... B01D 2253/1124; B01D 2253/306; B01D 2256/10; B01D 2256/16; B01D 2256/245; B01D 2257/504; B01D 53/02; B01D 53/62; B01D 2253/308; B01D 2253/311; B01J 20/28083; C01F 11/02; Y02C 10/04; Y10T 428/2982
   See application file for complete search history.

(56) References Cited

U.S. PATENT DOCUMENTS 5,087,597 A    2/1992  Leal et al.
5,520,894 A    5/1996  Heesink et al.
(Continued)

FOREIGN PATENT DOCUMENTS

KR   10-2007-0044177 A    4/2007
KR   10-0940464 B1         1/2010
(Continued)

OTHER PUBLICATIONS

Sunho Choi, et al. "Adsorbent Materials for Carbon Dioxide Capture from Large Anthropogenic Point Sources", ChemSusChem, vol. 2, pp. 796-854, (2009).
(Continued)

*Primary Examiner* — Christopher P Jones
(74) *Attorney, Agent, or Firm* — Harness, Dickey & Pierce, P.L.C.

(57) ABSTRACT

A carbon dioxide adsorbent includes a porous metal oxide represented by Chemical Formula 1, the porous metal oxide having a specific surface area of greater than or equal to about 30 $m^2/g$, and an average pore size of greater than or equal to about 2 nm.

14 Claims, 8 Drawing Sheets

(51) Int. Cl.
  *C01F 11/02* (2006.01)
  *B01D 53/62* (2006.01)
  *C01F 11/06* (2006.01)
  *C01F 11/18* (2006.01)

(52) U.S. Cl.
  CPC .............. *C01F 11/02* (2013.01); *C01F 11/06* (2013.01); *C01F 11/18* (2013.01); *C01F 11/187* (2013.01); *C01F 11/188* (2013.01); *B01D 2253/1124* (2013.01); *B01D 2253/306* (2013.01); *B01D 2253/308* (2013.01); *B01D 2253/311* (2013.01); *B01D 2256/10* (2013.01); *B01D 2256/16* (2013.01); *B01D 2256/245* (2013.01); *B01D 2257/504* (2013.01); *C01P 2002/72* (2013.01); *C01P 2004/04* (2013.01); *C01P 2004/64* (2013.01); *C01P 2006/12* (2013.01); *C01P 2006/14* (2013.01); *C01P 2006/16* (2013.01); *Y02C 10/04* (2013.01); *Y02C 10/08* (2013.01); *Y02P 20/152* (2015.11); *Y10T 428/2982* (2015.01)

(56) References Cited

U.S. PATENT DOCUMENTS

| | | | |
|---|---|---|---|
| 8,168,156 B2 | 5/2012 | Yu et al. | |
| 2001/0042440 A1* | 11/2001 | Miyazawa | B01D 53/02 95/139 |
| 2006/0093540 A1* | 5/2006 | Fan | B01D 53/1475 423/247 |
| 2010/0311577 A1 | 12/2010 | Li et al. | |
| 2012/0025134 A1 | 2/2012 | Feng et al. | |
| 2012/0128559 A1 | 5/2012 | Olsen | |
| 2012/0138860 A1 | 6/2012 | Seo et al. | |
| 2013/0078159 A1 | 3/2013 | Fan et al. | |
| 2013/0199373 A1 | 8/2013 | Kwon et al. | |
| 2013/0236726 A1 | 9/2013 | Kwon et al. | |
| 2013/0247757 A1 | 9/2013 | Lee et al. | |
| 2014/0251135 A1 | 9/2014 | Kwon et al. | |
| 2014/0260977 A1 | 9/2014 | Kwon et al. | |
| 2014/0305302 A1 | 10/2014 | Kwon et al. | |
| 2014/0312272 A1* | 10/2014 | Chen | B01J 20/041 252/192 |
| 2015/0122124 A1 | 5/2015 | Kwon | |

FOREIGN PATENT DOCUMENTS

| | | |
|---|---|---|
| KR | 10-2012-0060145 A | 6/2012 |
| KR | 10-2013-0089587 | 8/2013 |
| KR | 10-2013-0101936 | 9/2013 |
| KR | 10-2013-0109061 A | 10/2013 |
| KR | 10-2013-0109830 | 10/2013 |
| KR | 10-2014-0082048 A | 7/2014 |
| KR | 10-2014-0111549 A | 9/2014 |
| KR | 10-2014-0113169 A | 9/2014 |
| KR | 10-2014-0123849 A | 10/2014 |
| KR | 20150052680 A | 5/2015 |
| WO | WO-2013/024141 A2 | 2/2013 |

OTHER PUBLICATIONS

Shashikala Veldurthi, et al. "Synthesis of mesoporous MgO single crystals without templates", Microporous and Mesoporous Materials, vol. 152, pp. 31-36, (2012).

* cited by examiner (a)

(b)

(a)

(b)

(a)

(b)

CARBON DIOXIDE ADSORBENTS, PRODUCTION METHODS THEROF, AND METHODS FOR SEPARATING CARBONDIOXIDE USING THE SAME

CROSS-REFERENCE TO RELATED APPLICATION

This application claims priority to and the benefit of Korean Patent Application No. 10-2013-0169373 filed in the Korean Intellectual Property Office on Dec. 31, 2013, the entire contents of which are incorporated herein by reference.

BACKGROUND

1. Field

Example embodiments herein relate to a carbon dioxide adsorbent, a process for preparing the same, and a method of separating carbon dioxide using the same.

2. Description of the Related Art

A considerable increase in the concentration of global atmospheric $CO_2$, one of the greenhouse gases, has raised concern about climate change, and has led to increasing efforts in research and development on control of $CO_2$ emissions. The main $CO_2$ emission sources include fossil fuel-based power plants, vehicles, and manufacturing plants for cement, limestone, hydrogen, and ammonia.

Capture and separation of carbon dioxide from fixed facilities (e.g., various power plants or factories) are considered as first measures for the control of $CO_2$ emissions. The capture of carbon dioxide refers to a process of physically or chemically separating $CO_2$ among a gas mixture generated from chemical reactions or combustion of fossil fuels. In order to capture $CO_2$ by adsorption, carbon materials, zeolites, or metal-organic composite materials (MOF) may be used. They show a certain level of adsorption efficiency at a low temperature below about 200° C., but they have difficulties in being used for carbon dioxide adsorption in a higher temperature environment.

Among fixed $CO_2$-emission facilities emitting a considerable amount of carbon dioxide are fossil fuel-based power plants (e.g., an integrated gasification combined cycle (IGCC) system or a thermoelectric power plant) and natural gas wells. Such facilities require carbon dioxide adsorbent materials that may adsorb $CO_2$ at a relatively high temperature (e.g., about 200 to 550° C.), and may show relatively high durability under a relatively high temperature environment.

SUMMARY

Some example embodiments relate to a carbon dioxide adsorbent including a porous oxide of an alkali earth metal.

Some example embodiments relate to a method of separating carbon dioxide that includes using the carbon dioxide adsorbent.

According to example embodiments, a carbon dioxide adsorbent includes a porous metal oxide represented by Chemical Formula 1, the porous metal oxide having a specific surface area of greater than or equal to about 30 $m^2/g$, and an average pore size of greater than or equal to about 2 nm:

$$MeO \qquad \text{[Chemical Formula 1]}$$

(wherein Me is one of Ca, Sr, and Ba).

The porous metal oxide may have a pore volume of greater than or equal to about 0.17 $cm^3/g$.

The porous metal oxide may have a specific surface area of greater than or equal to about 40 $m^2/g$.

The porous metal oxide may have an average pore size of less than or equal to about 300 nm.

The porous metal oxide may have one of simple cubic pores and spherical pores.

The porous metal oxide may have a specific surface area of greater than or equal to about 40 $m^2/g$ and an average pore size of greater than or equal to about 10 nm.

According to example embodiments, a process for preparing a carbon dioxide adsorbent includes dissolving a metal salt including one of Ca, Sr, and Ba in water to obtain an aqueous solution, adding an alkaline compound to the aqueous solution to obtain a precipitate, drying the precipitate, and calcining the dried precipitate to obtain a porous metal oxide represented by Chemical Formula 1, the porous metal oxide having a specific surface area of greater than or equal to about 30 $m^2/g$, and an average pore size of greater than or equal to about 2 nm:

$$MeO \qquad \text{[Chemical Formula 1]}$$

(wherein Me is one of Ca, Sr, and Ba).

The alkaline compound may be added to the aqueous solution at a temperature of greater than or equal to about 25° C.

The precipitate may be dried by freezing the precipitate at a temperature of less than or equal to about 0° C. and removing water from the frozen precipitate under a reduced pressure.

The precipitate may be dried using a supercritical fluid. The supercritical fluid may be supercritical carbon dioxide.

The dried precipitate may be calcined at a temperature of greater than or equal to about 400° C.

According to example embodiments, a method of separating carbon dioxide includes contacting a gas mixture containing carbon dioxide with a carbon dioxide adsorbent including a porous metal oxide, the porous metal oxide being represented by Chemical Formula 1, having a specific surface area of greater than or equal to about 30 $m^2/g$, and having an average pore size of greater than or equal to about 2 nm.

The gas mixture may further include at least one gas selected from hydrogen, nitrogen, and methane.

The method may further include heat-treating the carbon dioxide adsorbent at a temperature of greater than or equal to about 50° C. under a reduced pressure to desorb carbon dioxide adsorbed to the adsorbent.

The carbon dioxide adsorbent according to the aforementioned example embodiments shows relatively high adsorption capacity and is thermally stable. Using such a carbon dioxide adsorbent makes it possible to reduce exhaustion of carbon dioxide, and the highly concentrated carbon dioxide obtained therefrom may be effectively used in a $CO_2$ conversion process.

DETAILED DESCRIPTION

Figure 1:
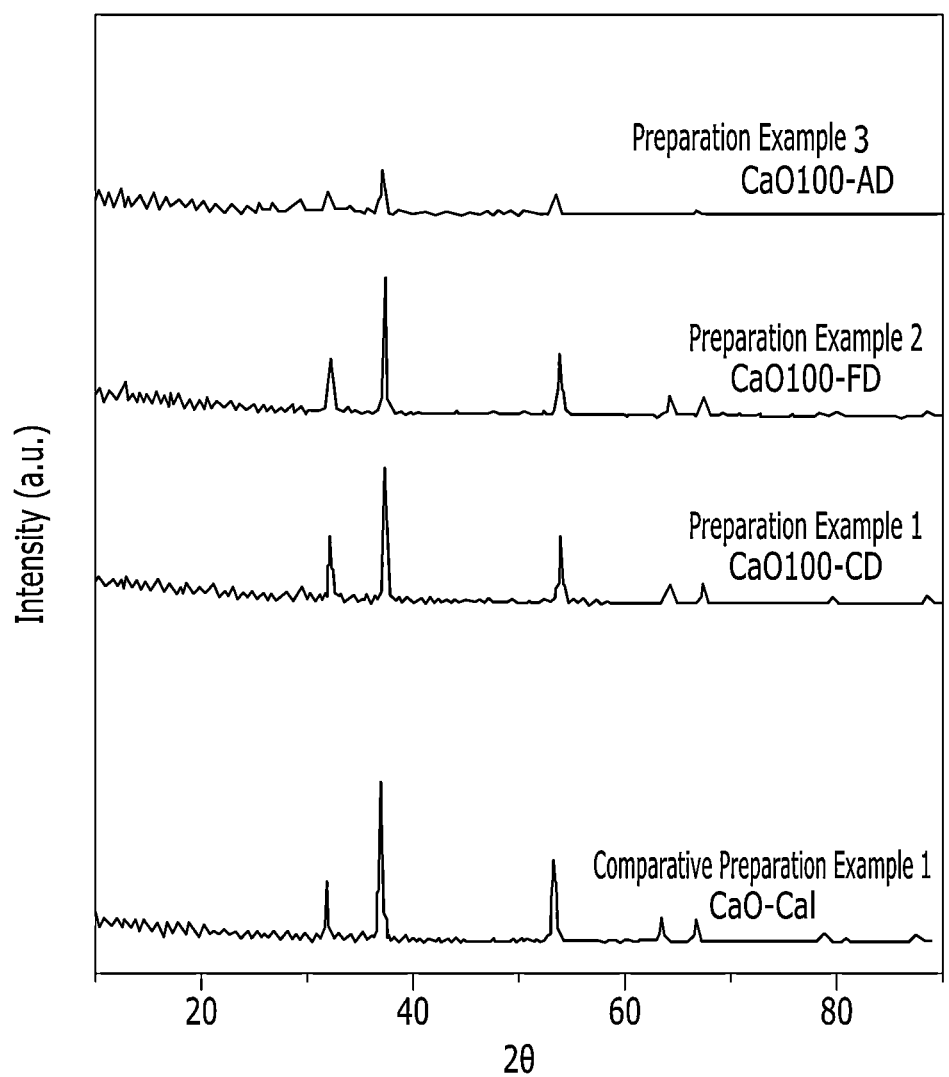
FIG. 1 shows X-ray diffraction spectrums of the calcium oxide of Comparative. Preparation Example 1 and the porous calcium oxides of Preparation Examples 1 to 3.

The advantages and characteristics of example embodiments, and the method of achieving them, will be clearly understood referring to accompanying drawings. However, the inventive concepts are not limited to the following example embodiments. The example embodiments are provided to complete the disclosure of the inventive concepts and aid understanding of a person having ordinary knowledge in the art to fully understand the category of example embodiments, and example embodiments as defined by the claims. Thus, in some example embodiments, well-known technologies are not specifically explained to avoid ambiguous understanding of inventive concepts.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising,"-when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all' terms used in the specification (including technical and scientific terms) may be used with meanings commonly understood by a person having ordinary knowledge in the art. Further, unless explicitly defined otherwise, the terms defined in a generally-used dictionary are not ideally or excessively interpreted. In addition, unless explicitly described to the contrary, the word "include" and variations such as "includes" or "including" will be understood to imply the inclusion of stated elements but not the exclusion of any other elements throughout the specification.

Unless specifically mentioned to the contrary, a singular form includes a plural form.

Unless specifically mentioned to the contrary, the term "input gas stream" used herein refers to a gas stream prior to passing through an adsorbent region or prior to initial contact with an adsorbent.

A carbon dioxide adsorbent according to example embodiments may include a porous metal oxide, which is represented by Chemical Formula 1, has a specific surface area of greater than or equal to about 30 $m^2/g$, for example, greater than or equal to about 40 $m^2/g$, and has an average pore size of greater than or equal to about 2 nm, for example greater than or equal to about 10 nm:

$$MeO \qquad \text{[Chemical Formula 1]}$$

(wherein, Me is one of Ca, Sr, and Ba).

The porous metal oxide has a pore volume of greater than or equal to about 0.17 $cm^3/g$, for example greater than or equal to about 0.18 $cm^3/g$ or greater than or equal to about 0.19 $cm^3/g$. The porous metal oxide has an average pore size of less than or equal to about 300 nm, for example less than or equal to about 200 nm. The porous metal oxide has a simple cubic pore or a spherical pore.

The metal oxide represented by Chemical Formula 1 (e.g., calcium oxide) has relatively high basicity and thus may effectively capture carbon dioxide, and is thermally stable. However, the calcium oxide may show substantial $CO_2$ adsorption performance at a high temperature of greater than or equal to about 650° C. In other words, the calcium oxide may require such a high temperature to trigger a $CO_2$ adsorption reaction, and this is because the following reaction thermodynamically requires a high temperature and the carbon dioxide may have difficulties in moving to an unreacted adsorption site on the surface of the calcium oxide.

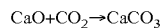

$$CaO + CO_2 \rightarrow CaCO_3$$

By contrast, as the aforementioned porous metal oxide represented by Chemical Formula 1 has a high level of a specific surface area and a high value of an average pore size, it may exhibit an enhanced level of adsorption capacity even at a temperature below about 650° C., for example less than or equal to about 600° C. Without wishing to be bound by any theory, the aforementioned porous metal oxide has more defect sites in the crystal structure thereof and thus it may have an increased number of the $CO_2$ adsorption sites, and as a result, when it is used as a $CO_2$ adsorbent, the carbon dioxide adsorption reaction on porous calcium oxide may occur at a lower temperature than that on a conventional calcium oxide. Accordingly, the carbon dioxide adsorbent including the foregoing porous metal oxide may show a substantial adsorption capacity at a lower temperature than the conventional calcium or barium oxide, and it may have enhanced adsorption capacity (for example, increased by two times) at a given temperature.

As calcium and barium are elements having high basicity and high affinity to carbon dioxide, carbon dioxide that is slightly acidic may easily adsorb onto the porous metal oxide. The $CO_2$ adsorption and desorption reaction of the porous metal oxide has a Gibbs free energy ($\Delta G$) of less than zero in a relatively high temperature range, and thus the porous metal oxide may effectively capture carbon dioxide (for example, via physical and/or chemical adsorption) at a temperature range from about 200° C. to about 550° C., which is required for the application to a thermal power plant. In particular, the porous metal oxide has a low level of heat of adsorption so that its regeneration requires low energy.

The porous metal oxide may be fine particles having an average particle size of about 1 μm or less. In addition, the fine particles have a relatively uniform size, and a relative standard deviation of the particle size is less than or equal to about 20%, for example less than or equal to about 10%.

As confirmed by a transmission electron microscopic analysis, the porous metal oxide has simple cubic pores. In example embodiments, as confirmed by a transmission electron microscopic analysis, the porous metal oxide may have spherical pores. Such shapes of pores may imply that the porous metal oxide has many defects on a surface thereof. Therefore, a carbon dioxide adsorbent including the porous metal oxide may have a larger specific surface area and thus have more adsorption sites for carbon dioxide. In addition, the adsorbent may have a defect-rich portion and thus may exhibit higher reactivity to carbon dioxide.

The porous metal oxide may be prepared in accordance with a method that includes:

dissolving a water soluble metal salt including one of Ca, Sr, and Ba in water to obtain an aqueous solution of the metal salt;

adding an alkaline compound to the aqueous solution of the metal salt to obtain a precipitate;

drying the precipitate; and calcining the dried precipitate to obtain a porous metal oxide.

The water soluble metal salt including Ca, Sr, or Ba may be any water soluble salt that includes Ca, Sr, or Ba, and the types thereof are not particularly limited. For example, the water soluble metal salt may be metal chlorides (e.g., calcium chloride, barium chloride, and/or strontium chloride); a metal hydroxide (e.g., calcium hydroxide, barium hydroxide, and/or strontium hydroxide); a metal nitrate (e.g., calcium nitrate, barium nitrate, and strontium nitrate); a metal sulfate (e.g., calcium sulfate, barium sulfate, and strontium sulfate); and a metal acetate (e.g., calcium acetate, barium acetate, and strontium acetate), but it is not limited thereto.

The water soluble metal salt may be dissolved in water, for example, at a temperature of 25° C. or higher to obtain an aqueous solution of the metal salt. A concentration of the aqueous solution of the metal salt is not particularly limited, and may be selected appropriately.

An alkaline compound is added to the aqueous solution of the metal salt to form a precipitate, and the precipitate thus formed (for example, including a metal hydroxide (e.g., calcium hydroxide and/or barium hydroxide) may be aged (for example, under stirring). The types of the alkaline compound are not particularly limited, and may be selected appropriately. For example, the alkaline compound may be a hydroxide of an alkali metal or an alkali earth metal (e.g., sodium hydroxide, potassium hydroxide, calcium hydroxide, and magnesium hydroxide, or a combination thereof). The amount of the alkaline compound is not particularly limited and may be adjusted in light of the amount of the metal salt, the type of the alkaline compound, and the pH. For example, the amount of the alkaline compound may be at least one mole per one mole of the metal salt. The formation and the aging (for example, under stirring) of the precipitate may be carried out at a temperature of about 25° C. to about 150° C., for example about 40° C. to about 110° C. For example, the formation and the aging of the precipitate may be carried out at a temperature of greater than or equal to about 40° C., for example greater than or equal to about 50° C., greater than or equal to about 60° C., greater than or equal to about 70° C., greater than or equal to about 80° C., or greater than or equal to about 90° C., for example for 10 minutes or longer, 30 minutes or longer, 40 minutes or longer, 50 minutes or longer, or an hour or longer (e.g., for one hour to 10 hours).

The precipitate thus obtained is separated from the aqueous solution in a proper manner and dried.

The separation may be carried out by simple filtration or centrifugation.

The drying may be carried out at a temperature of greater than or equal to about 60° C., (e.g., about 60° C. to about 200° C.) under a pressure of one bar or lower. The drying under such conditions may be carried out for about 3 hours to about 48 hours.

Alternatively, the drying may be carried out by freeze drying, which includes freezing the precipitate at a temperature of less than or equal to about 273 K, for example at a temperature of less than or equal to about 263 K, less than or equal to about 253 K, less than or equal to about 243 K, less than or equal to about 233 K, less than or equal to about 195 K, or less than or equal to about 77 K, and holding the frozen precipitate under a pressure of 0.1 bar or lower to remove water therefrom (for example, via evaporation or sublimation). For example, the freeze drying may be carried out by freezing the precipitate in liquid nitrogen for 0.2 hours to 2 hours and drying the frozen precipitate at a temperature of about 25° C. or lower and under vacuum for 3 hours to 48 hours.

In example embodiments, the drying may be carried out by using a supercritical fluid (e.g., supercritical carbon dioxide) (hereinafter, also referred to as supercritical drying). The supercritical drying may be conducted by placing the separated precipitate in a high pressure reactor and supplying a supercritical fluid (i.e., a fluid at a temperature and pressure above its critical point) to the reactor. For example, when the supercritical fluid of carbon dioxide is used, it has a critical temperature of 304.1 K and a critical pressure of 72.8 atm. Therefore, the reactor is controlled to have a temperature of about 37° C. or higher, for example a temperature of about 40° C. or higher, a temperature of about 45° C. or higher, or a temperature of about 50° C. or higher, and under a pressure of greater than or equal to about 73 atm, for example under a pressure of greater than or equal to about 80 atm, while liquid carbon dioxide is supplied thereto. After the drying, the supercritical fluid may be slowly removed from the reactor. The supercritical drying may be carried out for about 0.2 hours to about 2 hours.

Without wishing to be bound by any theory, when the precipitate is in contact with the supercritical carbon dioxide and then is calcined, the following reaction may occur.

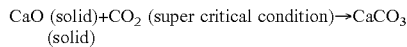

$$CaO \text{ (solid)} + CO_2 \text{ (super critical condition)} \rightarrow CaCO_3 \text{ (solid)}$$

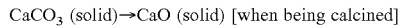

$$CaCO_3 \text{ (solid)} \rightarrow CaO \text{ (solid) [when being calcined]}$$

The solid product thus obtained may have the morphological characteristics (e.g., a specific surface area, a pore volume, and/or an average pore size) as mentioned above. In particular, the solid product may have a relatively high value of a specific surface area and thus more active adsorption sites for carbon dioxide, and its crystalline structure may have a defect-rich portion which allows higher reactivity with carbon dioxide.

The dried precipitate is calcined to produce a carbon dioxide adsorbent including a porous metal oxide. Conditions for the calcination are not particularly limited and may be selected appropriately. For example, the calcination may be carried out under an oxygen-containing atmosphere (e.g., in air) at a temperature of greater than or equal to about 550° C., for example a temperature of greater than or equal to about 600° C., greater than or equal to about 700° C., greater than or equal to about 800° C., or greater than or equal to about 850° C., for one hour or longer, for example for 3 hours or longer, 5 hours or longer, or 24 hours or longer, but it is not limited thereto. The calcination may be carried out at a temperature of less than or equal to about 1100° C., but it is not limited thereto. Details of the porous metal oxide and the adsorbent including the same are the same as set forth above.

The carbon dioxide adsorbent including the porous metal oxide having the aforementioned structure may exhibit increased $CO_2$ adsorption capacity (for example, a $CO_2$ adsorption capacity that is increased by at least 50%) in comparison with the metal oxide that has the same chemical formula but fails to exhibit the foregoing morphological properties. In example embodiments, the $CO_2$ adsorbent including the porous metal oxide having the foregoing morphological properties may have a higher adsorption capacity at a lower temperature than the porous metal oxide being represented by the same chemical formula but not having the foregoing morphological properties.

In example embodiments, the method of separating carbon dioxide may include contacting a gas mixture including carbon dioxide with a carbon dioxide adsorbent including a porous metal oxide at a temperature of greater than or equal to about 400° C., wherein the porous metal oxide is represented by the above Chemical Formula 1, has a specific surface area of greater than or equal to about 30 m²/g, and has an average pore size of greater than or equal to about 2 nm.

Figure 8:
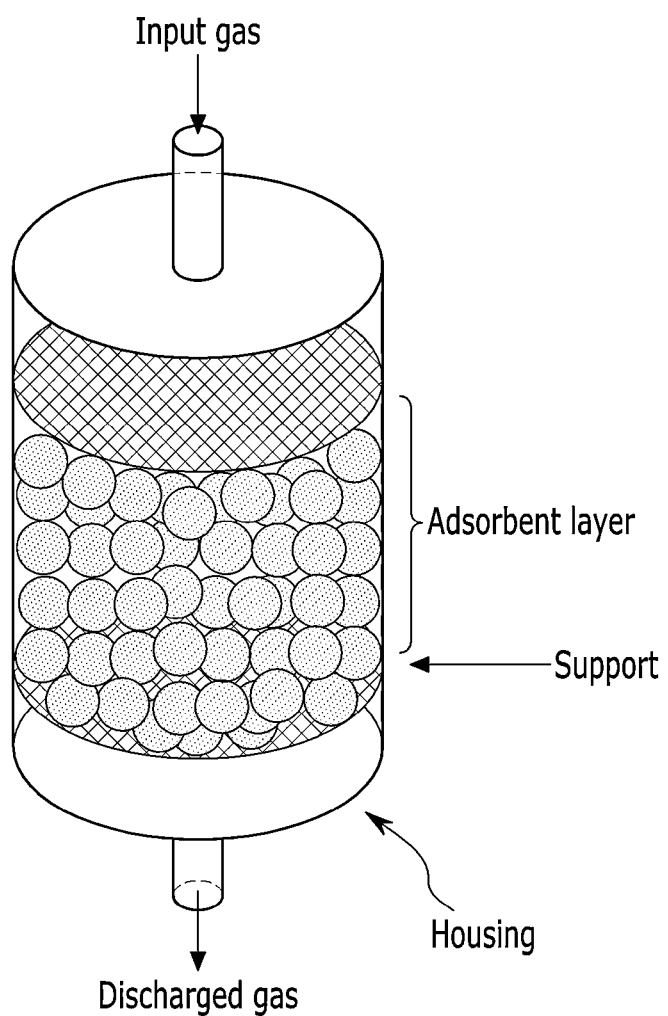
FIG. 8 illustrates a schematic view of a carbon dioxide capture module according to example embodiments.

Details of the adsorbent including the porous metal oxide are the same as set forth above. The carbon dioxide adsorbent including the porous metal oxide may be provided in the form of a carbon dioxide capture module, for example, as illustrated in FIG. 8. The carbon dioxide capture module may be in any form that is used for separation or capture of carbon dioxide, and its types are not particularly limited.

FIG. 8 illustrates a schematic view of a carbon dioxide capture module 10 according to example embodiments.

The carbon dioxide capture module 10 may include an adsorption layer 300 including the carbon dioxide adsorbent, a support plate 200 holding the adsorption layer 300, and a housing 100 including an inlet 105 for an input gas stream and an outlet 110 for the treated gas stream.

The thickness of the adsorption layer 300 is not particularly limited, but may be greater than or equal to about 0.2 cm, for example, from about 0.5 cm to about 3 cm. The support plate 200 may be made of any materials as long as it may support the adsorbent while allowing the flow of the input gas. Examples of the material may include quartz wool.

Materials and shapes of the housing 100 for the module are not particularly limited, but may be selected as needed. By way of non-limiting examples, the housing 100 may be made of stainless steel, copper pipe, or quartz pipe, and may have a shape of a cylinder, a prism, or a square column.

The gas mixture including carbon dioxide may be an input gas stream including carbon dioxide. Besides carbon dioxide, the gas mixture or the input gas stream may further include at least one gas selected from hydrogen, nitrogen, and hydrocarbons (e.g., methane). The composition of the input gas stream is not particularly limited, but may be appropriately selected as needed. For example, the input gas stream may include carbon dioxide and nitrogen like in a flue gas generated from a fossil fuel power plant. The input gas stream may include carbon dioxide and hydrogen like in a flue gas generated from an integrated gasification combined cycle (IGCC) power plant. The input gas stream may include carbon dioxide and methane like in a gas generated from a natural gas well. The flow rate of supplying the input gas stream is not particularly limited, but may be appropriately selected as desired. For example, the flow rate may be less than or equal to about 1000 ml/min, and specifically, less than or equal to about 500 ml/min.

The carbon dioxide adsorbent may be brought into contact with the gas mixture at a temperature of greater than or equal to about 25° C., and for example, at a temperature of greater than or equal to about 35° C., at a temperature of greater than or equal to about 50° C., at a temperature of greater than or equal to about 70° C., at a temperature of greater than or equal to about 100° C., at a temperature of greater than or equal to about 200° C., at a temperature of greater than or equal to about 300° C., at a temperature of greater than or equal to about 400° C., or at a temperature of greater than or equal to about 500° C.

The method of separating carbon dioxide may further include heat-treating the carbon dioxide adsorbent at a temperature of about 50° C. to about 800° C. under a reduced pressure to desorb carbon dioxide, and emitting the same. The desorption pressure is not particularly limited, and may be selected appropriately. For example, the desorption pressure may be less than or equal to about 5 bar, for example about 1 bar to 0.05 bar, or 0.1 bar.

The carbon dioxide adsorbent includes a porous oxide of calcium or barium having relatively high basicity, and the oxide has a relatively high specific surface area, a relatively high value of an average pore size and pore volume, and an increased number of adsorption sites due to the increase in defects. Therefore, the carbon dioxide adsorbent may exhibit relatively high adsorption capacity at a lower temperature than any conventional oxides, and the adsorbed carbon dioxide may be more easily desorbed so that using the aforementioned adsorbent allows providing relatively high quality carbon dioxide. The carbon dioxide adsorbent may be advantageously utilized in a separation process for carbon dioxide and methane in gas wells and a separation process for carbon dioxide and hydrogen in a pre-combustion power station.

The following examples illustrate example embodiments in more detail. However, the example embodiments are examples, and this disclosure is not limited thereto.

EXAMPLES

Preparation of Porous Calcium Oxide I

Preparation Example 1: CaO100-CD 23.62 g of calcium nitrate $(Ca(NO_3)_2)$ is dissolved in 212.5 ml of distilled water at a temperature of 100° C. to obtain a 1 M aqueous solution of calcium nitrate. 20 g of a 2 M NaOH aqueous solution is added slowly to the aqueous solution of calcium nitrate under vigorous stirring. The added amount of NaOH is 2 moles with respect to 1 mole of calcium nitrate. The resulting mixed solution is stirred at a temperature of 100° C. for 3 hours to form a precipitate and age the same. The precipitate is separated from the solution via simple filtration and washed with distilled water until it has a neutral pH. After being washed, the precipitate thus obtained is dried in an oven at 120° C. for 12 hours.

The dried precipitate is calcined at a temperature of 550° C. for five hours to obtain a porous calcium oxide.

Preparation Example 2: CaO100-FD

A porous calcium oxide is obtained in the same manner as set forth in Preparation Example 1, except the drying of the washed precipitate is done by freeze drying using liquid nitrogen. The freeze drying is conducted as below.

After the washing, the precipitate is placed in liquid nitrogen for 20 minutes to obtain a frozen precipitate, which is then left under a reduced pressure of 0.1 bar or lower at a temperature of 25° C. for 12 hours to remove water.

After the freeze drying, the precipitate thus obtained is calcined at a temperature of 550° C. for 5 hours to obtain porous calcium oxide.

Preparation Example 3: CaO100-AD

A porous calcium oxide is obtained in the same manner as set forth in Preparation Example 1, except for drying the washed precipitate using carbon dioxide in a supercritical condition. The drying that uses the carbon dioxide in a supercritical condition is conducted as below.

After the washing, the precipitate is placed in a relatively high pressure reactor and liquid carbon dioxide that is in a supercritical condition is flowed into the reactor at a temperature of 50° C. under a pressure of about 75 atm for 20 minutes to remove water.

After the freeze drying, the precipitate thus obtained is calcined at a temperature of 550° C. for 5 hours to obtain porous calcium oxide.

Comparative Preparation Example 1

Calcium hydroxide (purchased from Aldrich Co., Ltd.) is calcined under the same conditions as set forth in Preparation Example 1 to obtain calcium oxide.

Preparation Example 4: Preparation of a Porous Barium Oxide 26.1 g of barium nitrate $(Ba(NO_3)_2)$ is dissolved in 235.2 ml of distilled water at a temperature of 100° C. to obtain a 1 M aqueous solution of barium nitrate. 20 g of a 2 M NaOH aqueous solution is added to the aqueous solution of barium nitrate under vigorous stirring. The added amount of NaOH is 2 moles with respect to 1 mole of barium nitrate. The resulting mixed solution is stirred at a temperature of 100° C. for 3 hours to form a precipitate and age the same. The precipitate is separated from the solution via simple filtration and washed with distilled water until it has a neutral pH. After being washed, the precipitate thus obtained is dried in an oven of 120° C. for 12 hours.

The dried precipitate is calcined at a temperature of 550° C. for five hours to obtain a porous barium oxide.

Experimental Example 1: X-Ray Diffraction Analysis

Using an X-ray diffractometer (from Phillips Co., Ltd., model name: XPert PRO), X-ray diffraction (XRD) analysis is made for the carbon dioxide adsorbent including the calcium oxide prepared in Preparation Examples 1, 2, and 3 and the calcium oxide prepared in Comparative Preparation Example 1, and the results are shown in FIG. 1.

The results of FIG. 1 confirm the followings. The metal oxides of the preparation examples and the comparative preparation example are calcium oxide. The calcium oxide of Preparation Example 3 has lower crystallinity than the oxides of the other preparation examples. Without wishing to be bound by any theory, the calcium oxide of Preparation Example 3 being dried by using a supercritical fluid may include many defect sites of an open type in a configuration of a calcium atom and an oxygen atom in the oxide so that it has lower crystallinity and spherical pores as confirmed by the following results of a scanning electronic microscopic analysis.

Experimental Example 2: SEM Analysis and TEM Analysis

Figure 2:
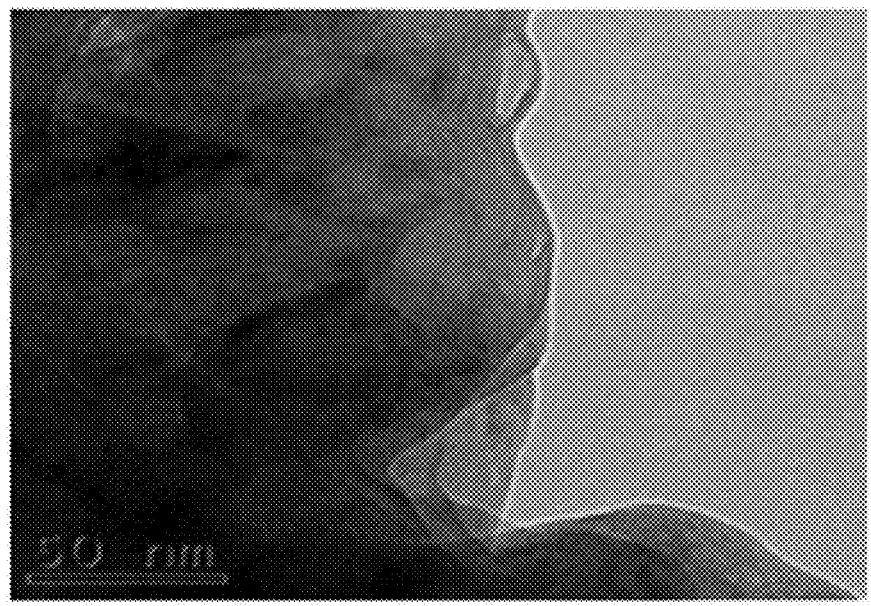
FIG. 2 is a TEM image of the calcium oxide of Comparative Preparation Example 1.
Figure 2:
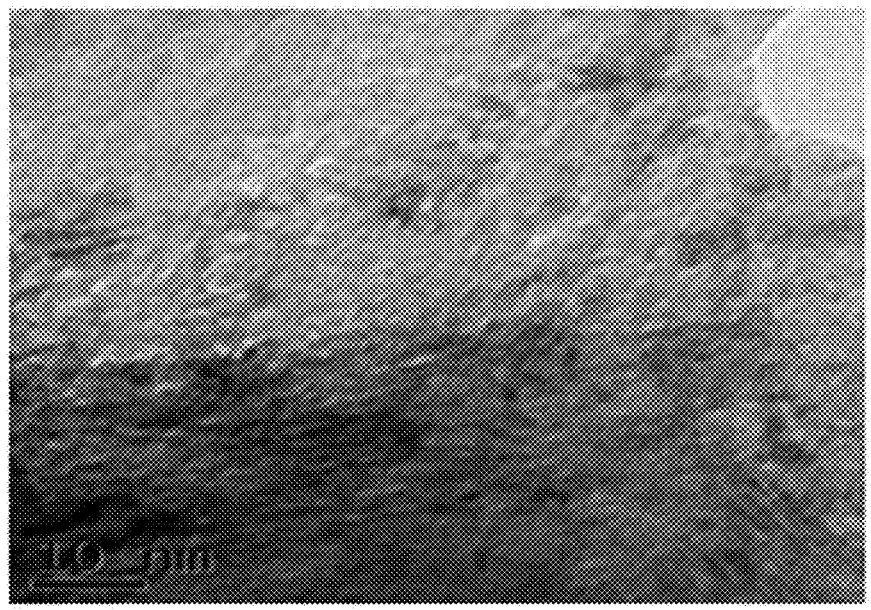
Figure 3:
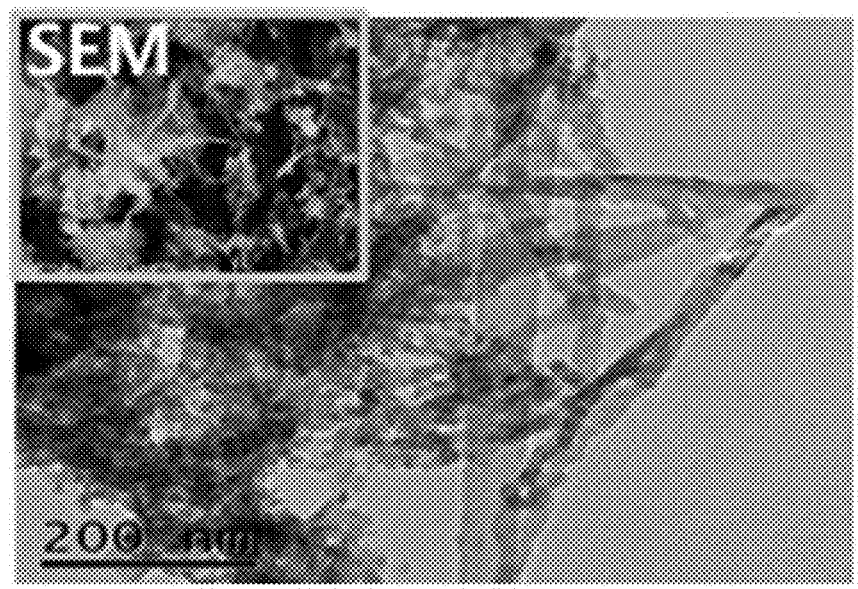
FIG. 3 is a TEM image of the porous calcium oxide of Preparation Example 2.
Figure 3:
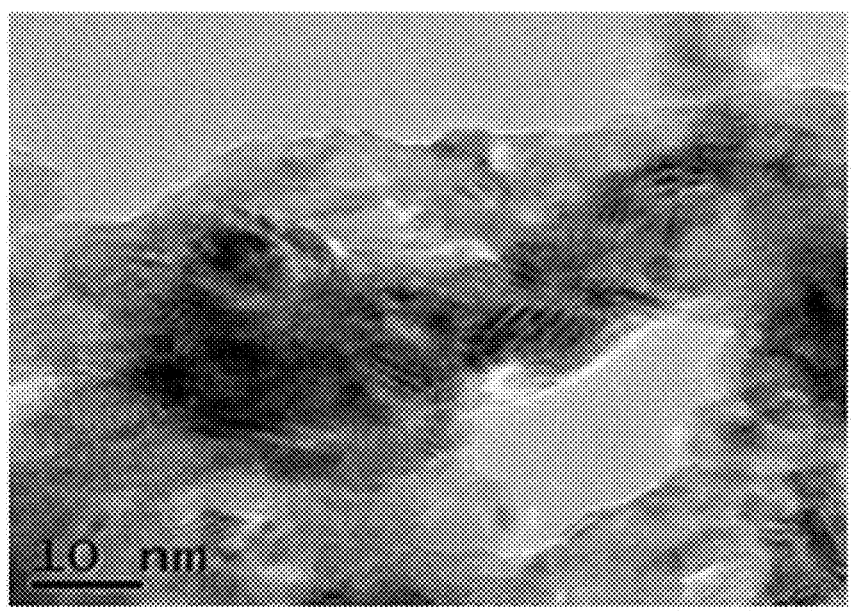
Figure 4:
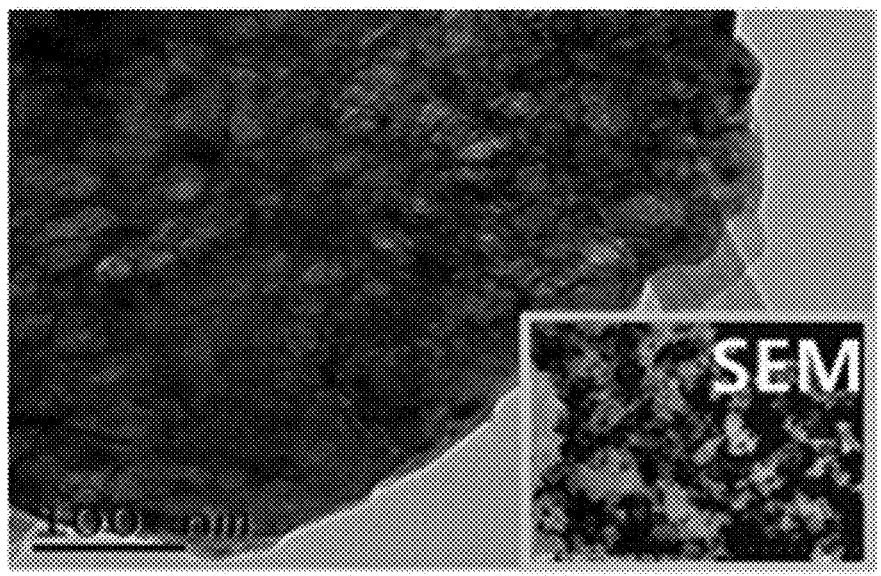
FIG. 4 is a TEM image of the porous calcium oxide of Preparation Example 3.
Figure 4:
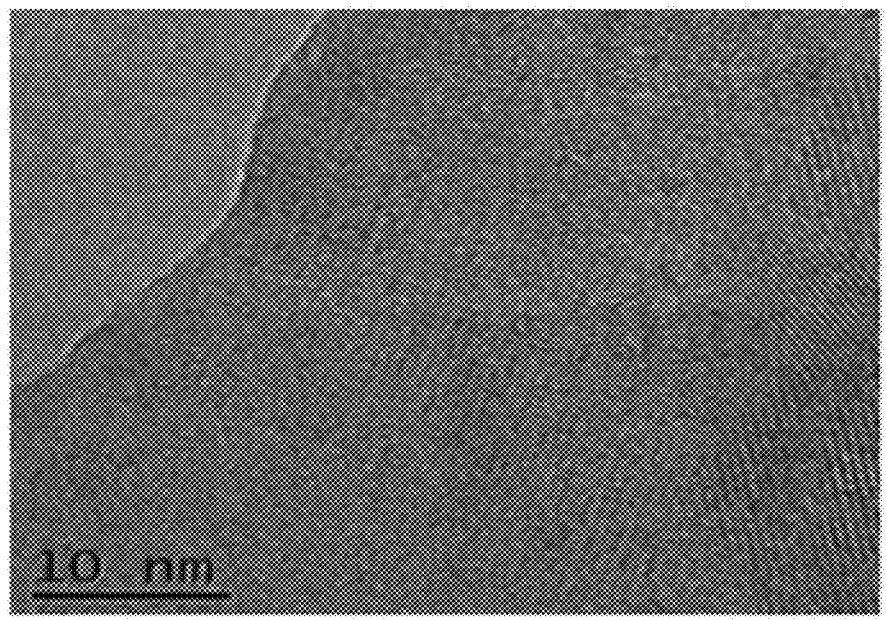

Using a scanning electron microscope (manufactured by HITACHI, model name: S4700) and a transmission electron microscope (manufactured by FEI, model name: Tecnai G2), a SEM analysis and a TEM analysis are made for the calcium oxides of Preparation Examples 1 to 3 and the calcium oxide of Comparative Example 1. Results are shown in FIGS. 2 to 4, which confirm the calcium oxide thus prepared has a well-developed crystalline direction. FIG. 3 confirms that the calcium oxide of Preparation Example 2 has a cubic crystalline structure having simple cubic pores. FIG. 4 confirms that the calcium oxide of Preparation Example 3 has spherical pores. Without wishing to be bound by any theory, the calcium oxide of Preparation Example 4 has a face centered crystalline structure, and the calcium oxide has a relatively high ratio of atom vacancy and many defects at an atomic position of calcium-oxygen.

Experimental Example 3: Nitrogen Adsorption Experiment

Figure 5:
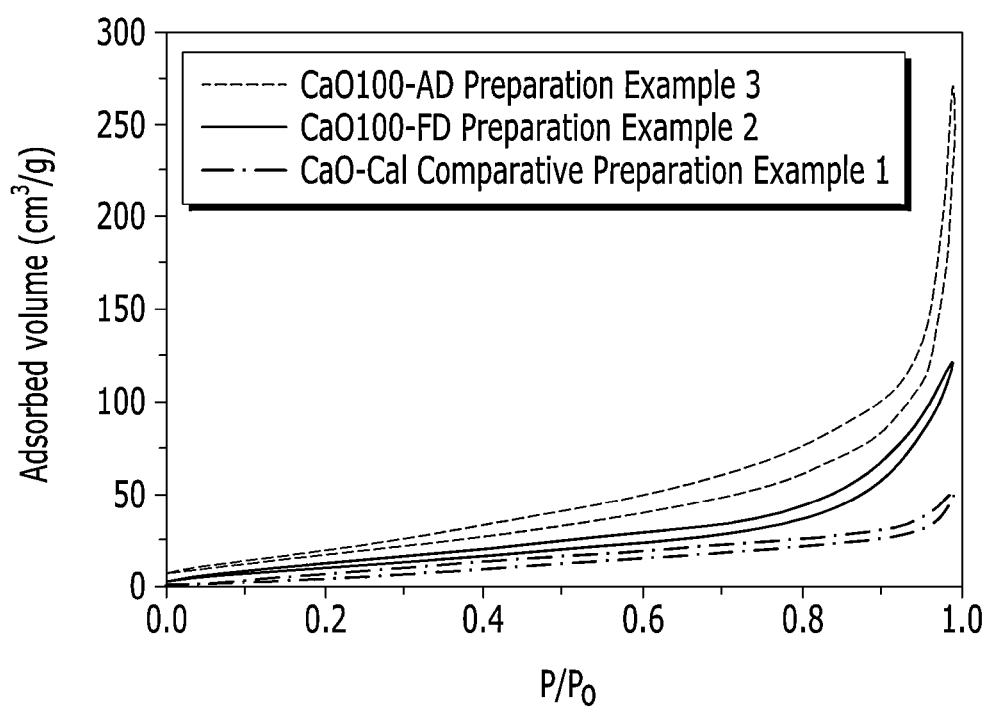
FIG. 5 is a view illustrating the results of a nitrogen adsorption experiment of the calcium oxide prepared from Comparative Preparation Example 1 and the porous calcium oxides prepared from Preparation Examples 2 and 3.

Adsorption/desorption isotherm curves for the oxides of Preparation Examples 2 and 3 and the oxide of Comparative Preparation Example 1 are obtained by conducting a nitrogen adsorption/desorption isothermal reaction using a Bell SorpMax instrument (manufactured by Bell Japan Co. Ltd.). The results are shown in FIG. 5. The results of FIG. 5 confirm that the porous calcium oxides of Preparation Examples 2 and 3 exhibit hysteresis in the nitrogen adsorption/desorption curves. The results of Table 1 confirm that the porous calcium oxides of Preparation Example 2 and Preparation Example 3 have a much higher value in specific surface area, pore size, and pore volume than the calcium oxide of Comparative Example 1.

TABLE 1

| Sample | Specific surface area (m²/g) | Pore size (nm) | Pore volume (cm³/g) |
|---|---|---|---|
| Cal-Cal (Comparative Prep. Example 1) | 22.4 | 1.64 | 0.16 |
| Cal100-FD (Prep. Example 2) | 47.3 | 21.53 | 0.19 |
| Cal100-AD (Prep. Example 3) | 76.7 | 107.6 | 0.41 |

Experimental Example 4: Tests for Temperature-Programmed Desorption of $CO_2$

Figure 6:
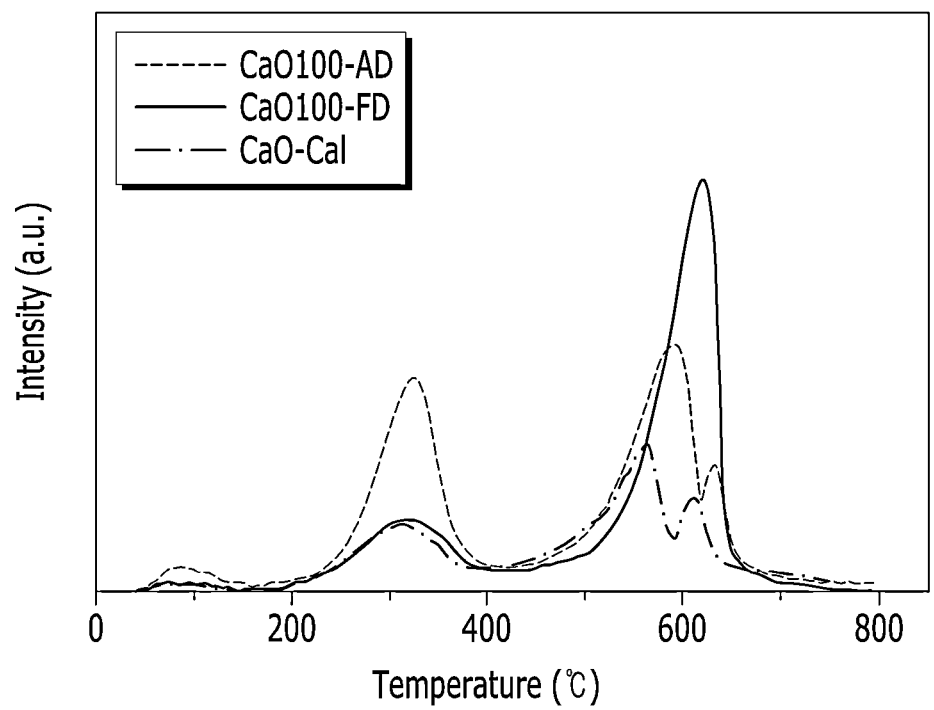
FIG. 6 is a view illustrating the results of a $CO_2$ temperature programmed desorption experiment of the calcium oxide prepared from Comparative Preparation Example 1 and the porous calcium oxides prepared from Preparation Examples 2 and 3.

Tests for temperature-programmed desorption of $CO_2$ are made under the following conditions, and the results are shown in FIG. 6.

Adsorption is conducted using 15% carbon dioxide, and helium is added thereto (total flow rate: 100 cc/min). Then, when the helium is added, the temperature is increased from 40° C. to 800° C. at a rate of 10° C./min.

From the temperature-programmed desorption curves of FIG. 6, a chemical adsorption amount at a low temperature, a chemical adsorption amount at a relatively high temperature, and a total chemical adsorption amount are calculated, and the results are compiled in Table 2.

TABLE 2

| | | Partial (wt %) | |
|---|---|---|---|
| Sample | Total (wt %) | Lower T (<400° C.) | Higher T (>400° C.) |
| CaO-cal (Comparative Prep. Example 1) | 3.45 | 1.04 | 2.41 |
| CaO100-FD (Prep. Example 2) | 6.07 | 1.33 | 4.74 |
| CaO100-AD (Prep. Example 3) | 6.56 | 2.98 | 3.58 |

The results of FIG. 6 and Table 2 confirm that the porous calcium oxides prepared in Preparation Examples 2 and 3 have a chemical adsorption amount that is two times higher than that of the calcium oxide of Comparative Preparation Example 1. The porous calcium oxide of Preparation Example 3 exhibits the highest value of the chemical adsorption amount. Without wishing to be bound by any theory, it is believed that many defects are present in the porous calcium oxide of Preparation Example 3, and thus the number of adsorption sites available at a lower temperature is significantly increased.

Figure 7:
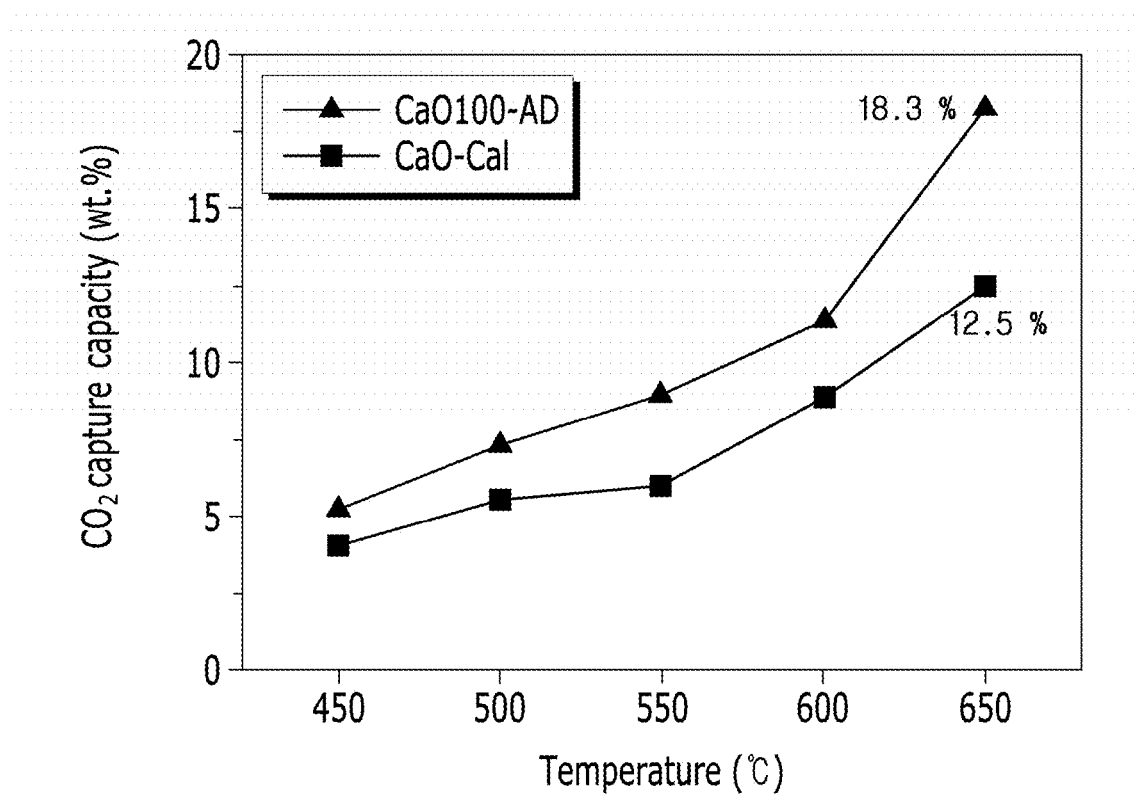
FIG. 7 is a view illustrating the adsorption capacity of the carbon dioxide adsorbents of Comparative Example 1 and Example 3.

Analysis of the $CO_2$ Adsorption Capacity of the Adsorbent Including the Porous Calcium Oxide $CO_2$ adsorption/desorption tests are made under the following conditions using a carbon dioxide adsorbent including the porous calcium oxide of Preparation Example 2 (Example 1), a carbon dioxide adsorbent including the porous calcium oxide of Preparation Example 3 (Example 2), and a carbon dioxide adsorbent including the porous calcium oxide of Comparative Preparation Example 1 (Comparative Example 1), and the results of Example 2 and Comparative Example 1 are shown in FIG. 7.

Input gas stream: 15% $CO_2$+85% $N_2$
Flow rate of the input gas stream: 200 mL/min
Amount of the adsorbent: 0.1 g
Adsorption temperature: 450° C. to 650° C.

The results of FIG. 7 confirm that the $CO_2$ adsorbent of Example 2 shows an adsorption capacity that is increased by at least about 50% in comparison with the adsorbent of Comparative Example 1.

While this disclosure has been described in connection with what is presently considered to be practical example embodiments, it is to be understood that the inventive concepts are not limited to the disclosed embodiments, but, on the contrary, are intended to cover various modifications and equivalent arrangements included within the spirit and scope of the appended claims.

What is claimed is:

1. A carbon dioxide adsorbent comprising a porous metal oxide represented by Chemical Formula 1,
the porous metal oxide having a specific surface area of greater than or equal to about 40 m²/g, an average pore size of greater than or equal to about 10 nm, and has a pore volume of greater than or equal to about 0.17 cm³/g:

MeO      [Chemical Formula 1]

wherein Me is one of Ca, Sr, and Ba.

2. The carbon dioxide adsorbent of claim 1, wherein the porous metal oxide has an average pore size of less than or equal to about 300 nm.

3. The carbon dioxide adsorbent of claim 1, wherein the porous metal oxide has simple cubic pores.

4. The carbon dioxide adsorbent of claim 1, wherein the porous metal oxide has spherical pores.

5. The carbon dioxide adsorbent of claim 1, wherein the porous metal oxide is configured to capture carbon dioxide at a temperature ranging from about 200° C. to about 550° C.

6. A process comprising:
dissolving a metal salt in water to obtain an aqueous solution, the metal salt including one of Ca, Sr, and Ba;
adding an alkaline compound to the aqueous solution to obtain a precipitate;
drying the precipitate; and
calcining the dried precipitate to obtain the carbon dioxide adsorbent of claim 1.

7. The process for preparing a carbon dioxide adsorbent of claim 6, wherein the adding adds the alkaline compound to the aqueous solution at a temperature of greater than or equal to about 25° C.

8. The process for preparing a carbon dioxide adsorbent of claim 6, wherein the drying freezes the precipitate at a temperature of less than or equal to about 0° C. and removes water from the frozen precipitate under a reduced pressure.

9. The process for preparing a carbon dioxide adsorbent of claim 6, wherein the drying includes using a supercritical fluid.

10. The process for preparing a carbon dioxide adsorbent of claim 9, wherein the supercritical fluid is supercritical carbon dioxide.

11. The process for preparing a carbon dioxide adsorbent of claim 6, wherein the calcining calcines the dried precipitate at a temperature of greater than or equal to about 400° C.

12. A method of separating carbon dioxide, the method comprising contacting the carbon dioxide adsorbent of claim 1 with a gas mixture containing carbon dioxide.

13. The method of claim 12, wherein the contacting contacts the carbon dioxide adsorbent with the gas mixture further including at least one gas selected from hydrogen, nitrogen, and methane.

14. The method of claim 12, further comprising:
heat-treating the carbon dioxide adsorbent at a temperature of greater than or equal to about 50° C. under a reduced pressure to desorb carbon dioxide adsorbed to the carbon dioxide adsorbent.

\* \* \* \* \*